(12) United States Patent
Nelson

(10) Patent No.: US 6,397,126 B1
(45) Date of Patent: May 28, 2002

(54) INTERFACED DISPENSING MACHINES AND REMOTE AUTOMATED PAYMENT AND INVENTORY MANAGEMENT SYSTEM

(76) Inventor: Kim Marie Nelson, 12784 Tulipwood Cir., Boca Raton, FL (US) 33428

( * ) Notice: Subject to any disclaimer, the term of this patent is extended or adjusted under 35 U.S.C. 154(b) by 0 days.

(21) Appl. No.: 09/563,622

(22) Filed: May 2, 2000

Related U.S. Application Data

(60) Provisional application No. 60/133,656, filed on May 11, 1999.

(51) Int. Cl.[7] ............................................. G06F 17/00
(52) U.S. Cl. ........................ 700/236; 700/231; 700/238
(58) Field of Search ................................. 700/231, 235, 700/236, 238, 241; 235/380, 381

(56) References Cited

U.S. PATENT DOCUMENTS

| | | | | |
|---|---|---|---|---|
| 5,091,713 A | * | 2/1992 | Horne et al. ............. | 700/231 X |
| 5,207,784 A | * | 5/1993 | Schwartzendruber ...... | 221/6 X |
| 5,450,938 A | * | 9/1995 | Rademacher ............ | 235/381 X |
| 5,845,577 A | * | 12/1998 | Nelson et al. ........... | 700/235 X |
| 5,947,328 A | * | 9/1999 | Kovens et al. ........... | 221/129 X |
| 6,038,491 A | * | 3/2000 | McGarry et al. ......... | 700/231 X |
| 6,152,365 A | * | 11/2000 | Kolls ...................... | 235/381 X |
| 6,193,154 B1 | * | 2/2001 | Phillips et al. ........... | 235/381 X |
| 6,227,972 B1 | * | 5/2001 | Walker et al. ............ | 235/380 X |
| 6,230,150 B1 | * | 5/2001 | Walker et al. ............ | 700/231 X |
| 6,295,482 B1 | * | 9/2001 | Tognazzini .............. | 700/233 X |

* cited by examiner

*Primary Examiner*—Christopher P. Ellis
*Assistant Examiner*—Gene O. Crawford

(57) ABSTRACT

A remote means for payment of purchases made using an automated vending machine. The remote means may include a signal or power to release the goods to the consumer. The remote means may interface with the vending machine using wires or wireless technology. The remote means may further provide a means to communicate to the service party when the vending machine requires servicing, such as when the inventory reaches a predetermined quantity. The remote means may also include the capability to communicate a signal which can modify the price of the goods. The preferred embodiment would be using a remote payment system in conjunction with a newspaper vending machine, as the newspaper vending machines operate using battery power, making power consumption a critical parameter.

2 Claims, 7 Drawing Sheets

INTERFACED DISPENSING MACHINES AND REMOTE AUTOMATED PAYMENT AND INVENTORY MANAGEMENT SYSTEM

This patent application claims priority to Provisional Patent Application 60/133,656 filed May 11, 1999.

FIELD OF THE INVENTION

This invention relates in general to a method and apparatus for an automated payment system within a vending machine which is interfaced through a remote automated financial transaction system to a financial institution/transaction means for the ability to provide a transaction for the unattended consumer goods.

BACKGROUND OF THE INVENTION

The present invention is generally related to the use of remote automated financial transaction systems for payment of goods provided to a consumer through an automated dispensing machine. Currently a consumer can enjoy the convenience of purchasing fuel without waiting to interact with an attendant through the implementation of automated payment systems at the fuel pumps, as taught by Wostl, et al (U.S. Pat. No. 3,786,421) and Gentile, et al (U.S. Pat. No. 3,931,497). Wostl, et al teaches the use of a credit card reader for the distribution of goods using an automated article dispensing system. Gentile, et al teaches similar to Wostl, with the focus on dispensing fuel. Both Wostl and Gentile teach the use of dispensing products from one of the specified dispensing machines.

The automated payment system receives the customer's payment information from any of several known methods such as reading a magnetic strip coupled to a plastic card, reading a coding from a Radio Frequency signal for a device such as a proximity card, direct interface to an integrated circuit card such as a smart card, or any other derived automated payment system recognized by one skilled in the art.

Upon authorization of the customer's provided automated payment system, the automated payment system allows the customer to dispense fuel into the customer's fuel storage device. Upon completion, the system records and communicates the transaction to the customer's payment institution. The automated payment system signals the customer for a receipt. Optionally, the automated payment system inquires the customer about including a car wash in the transaction. The automated transaction system provides a code to where the consumer enters the code into a keypad at the car wash to enable the car wash. Once a response to the inquiry is entered, or the automated transaction system completes a time out cycle, the automated transaction system completes the transaction.

Fuel stations have trended to include convenience marts at the same location, where the convenience marts provide sales of beverages, snacks, vehicle supplies (oils, fluids, etc.), newspapers, cigarettes, and even fast food retailers. Should the customer desire to purchase fuel and other items, the customer must complete two separate transactions and wait to interact with an attendant for servicing. Alternatively, the customer may purchase some convenience items through dispensing/vending machines, which require currency. The use of credit cards for a single dispensing machine purchase is normally cost prohibitive, as the cost of the purchase does not justify the incurred cost of the transaction. These reasons may deter the customer from making additional purchases. Alternatively, Vayda (U.S. Pat. No. 4,169,521) teaches a drive in, single stop shopping facility, using an attendant to service the vehicle and the customer.

Drive through systems are becoming an institution within several industries, including fast food, drugstores, and the like.

Selective call receivers, such as paging devices, wireless personal data assistants, and the like, are known to remotely control devices such as lawn sprinkling systems for golf courses.

Selective call receivers, such as paging devices, wireless personal data assistants, and the like, are known to have two way signal transmission capabilities.

Liquid Crystal Displays (LCD's) and video monitors are known technologies which are used as customer interface devices at fuel pumps.

Automated teller machines (ATM's) are known to have flexible, soft menus using each entry point for multiple functions.

Newspaper dispensers are preferred to be low cost, free standing, and located in remote locations. Additionally, the newspaper dispensers are generally placed at locations-that are not conducive to wired facilities, such as power, communications, and the like.

Vending machines and more specifically newspaper sales required that the automated vending machine have inventory. Newspapers have a shelf life of 24 hours, thus increasing the need for inventory control. Excess inventory must be scrapped; shortages limit the potential sales.

Automated dispensing or vending machines are known. Signal transmissions or other means to interface between two electronic circuits are known.

What is desired is a method and apparatus to provide for the customer to acquire goods through an automated dispensing machine and using a remote financial transaction system.

SUMMARY OF THE INVENTION

The present invention addresses the deficiencies in the present state of payment for convenience goods distributed through automated distributing machines, making credit/debit card payment financially efficient.

The following outlines the method embodiment of the present invention:

The first objective of the present invention is the use of a remote automated payment system in conjunction with an automated dispensing machine.

The second objective of the present invention is the use of a remote mechanism to active the dispensing mechanism on the automated dispensing machine.

The third objective of the present invention is to reduce the power required for the payment system at the automated vending machine.

The fourth objective of the present invention is the ability to have the automated dispensing machine provide a transmission to a remote automated financial transaction system.

The fifth objective of the present invention is the inclusion of a means to interface with a remote payment system within an automated dispensing machine.

The sixth objective of the present invention is the use of wireless technology to interface between the remote payment system and the automated dispensing machine.

The seventh objective of the present invention is the ability for the automated dispensing system to confirm signal transmission was completed with the remote financial transaction system.

The eighth objective of the present invention is the ability for the automated dispensing machine to interface with the automated payment system of a fuel dispenser.

The ninth objective of the present invention is the ability for the remote automated payment system to interface with a financial institution database.

The tenth objective of the present invention is the ability to vend convenience goods to the customer through an automated distribution machine, such as drinks, newspapers, cigarettes, change machines, snacks, any similar dispensed item, or any multiple items.

The eleventh objective of the present invention is an ability to interface with the customer to provide a means for the customer to request the purchase of convenience goods in addition to the purchase of fuel.

The twelfth objective of the present invention is an ability to tally the values of the goods purchased by the customer.

The thirteenth objective of the present invention is an ability to record the transaction.

The fourteenth objective of the present invention is an automated payment system interfaced with a fuel dispenser.

The fifteenth objective of the present invention is whereby the remote automated payment transaction systems may be a standard ATM system, a credit/debit card system within gasoline pumps, supermarkets, or other location.

The sixteenth objective of the present invention is the ability to select from multiple remote payment transaction systems.

The seventeenth objective of the present invention is the inclusion of a signal transmission means to verify communication between the automated dispensing machine and the remote automated payment system.

The eighteenth objective of the present invention is an electronic logic circuit and/or software to track all purchases and tally the purchases made by the customer.

The nineteenth objective of the present invention is a data recording system to record the transaction.

The twentieth objective of the present invention is an interface between a payment system of a drive through and an automated vending machine located along a drive through lane.

The twenty-second objective of the present invention is the use of a wireless device to transmit a signal when the automated vending machine requires servicing, such as when the inventory is depleted, the vending system requires servicing, and the like.

The twenty-third objective of the present invention is a means to remotely inquire whether inventory within a vending machine has been depleted.

A twenty-fourth objective of the present invention is a means for data collection, such as the time when the inventory of the vending machine reaches the predetermined quantity.

A twenty-fifth objective of the present invention is the use of a remote system to increase newspaper sales without incurring costs of additional facilities, such as communication and power.

A twenty-sixth objective of the present invention is the use of a remote means to change the price of respective goods.

BRIEF DESCRIPTION OF THE DRAWING

For the purpose of initially illustrating the invention, there is shown in the flow diagram, an embodiment which is presently preferred. It should be understood, however, that the present invention is not limited to the specific instrumentalities and methods disclosed. It can be recognized that the flow diagram represents a method and the associated apparatuses required to make the method in which persons skilled in the art may make various flow and interface diagrams from therein. In the drawing.

DETAILED DESCRIPTION OF THE DRAWING

Figure 1:
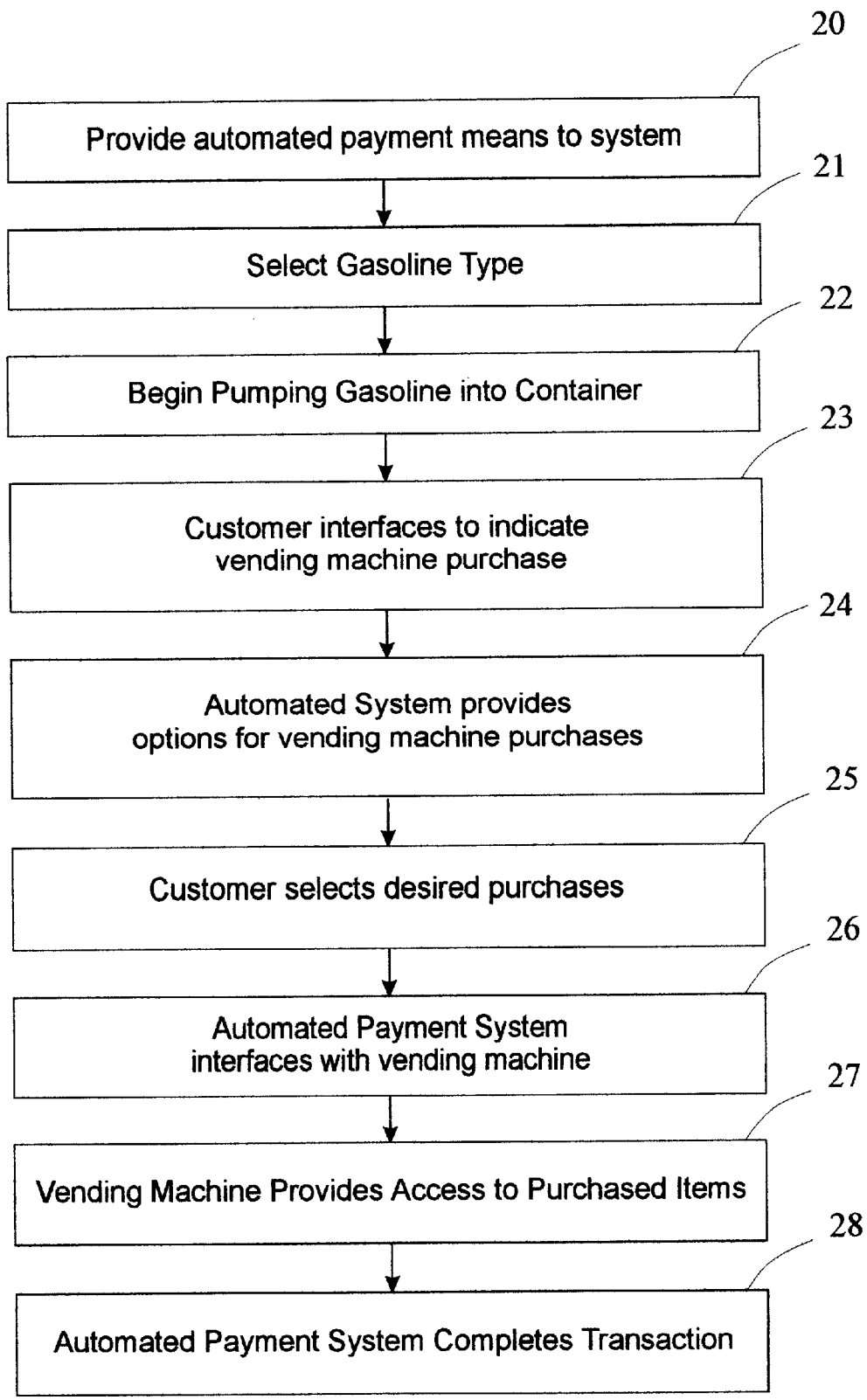
FIG. 1 is a flow chart diagram illustrating one potential process for achieving the desired invention. It should be understood that the order or process steps may deviate from the flow diagram provided, while maintaining the spirit and intent of the present invention.

FIG. 1 represents a flow diagram providing a general template for the present invention, where the spirit and intent of the present invention provides a means for a customer to make purchases from an electronically controlled vending machine within the same automated transactional purchase of fuel without the requirement to interact with an attendant. The vending machines may include those used to provide beverages, snacks, cigarettes, change or newspapers. A first step 20 in the preferred embodiment would be to provide the automated payment system a means to identify the customer's financial institution (either credit card, debit card, or other) or other means for automated payments such as smart cards. A second step 21 in the preferred embodiment would be where the customer would select the fuel type. A third step 22 in the preferred embodiment would be where the customer would begin dispensing fuel into the desired storage container, generally a fuel tank. The forth step 23 in the preferred embodiment would be where the customer has the ability to interface with the automated payment system to request a purchase from an interfaced electronically controlled vending machine. A fifth step 24 in the preferred embodiment would be where the automated payment system provides options for vending machine purchases. A sixth step 25 in the preferred embodiment would be where the customer selects the desired purchase from either the interfaced electronically controlled vending machine or automated a payment system. A seventh step 26 in the preferred embodiment interfaces the vending machine and the automated payment system to provide a tally for payment of all purchases. A eighth step 27 in the preferred embodiment provides a method for the customer to acquire the desired purchases from the vending machine. A final step 28 in the preferred embodiment is the completion of the transaction, providing the tally of all purchases to the financial institution or reducing the tally on a smart card, or other known method for completing an automated transaction.

It can be recognized that one skilled in the art can provide a variety of processes which can accomplish the same result using many variations of the above teachings without diverging from the spirit and intent of the present invention.

Figure 2:
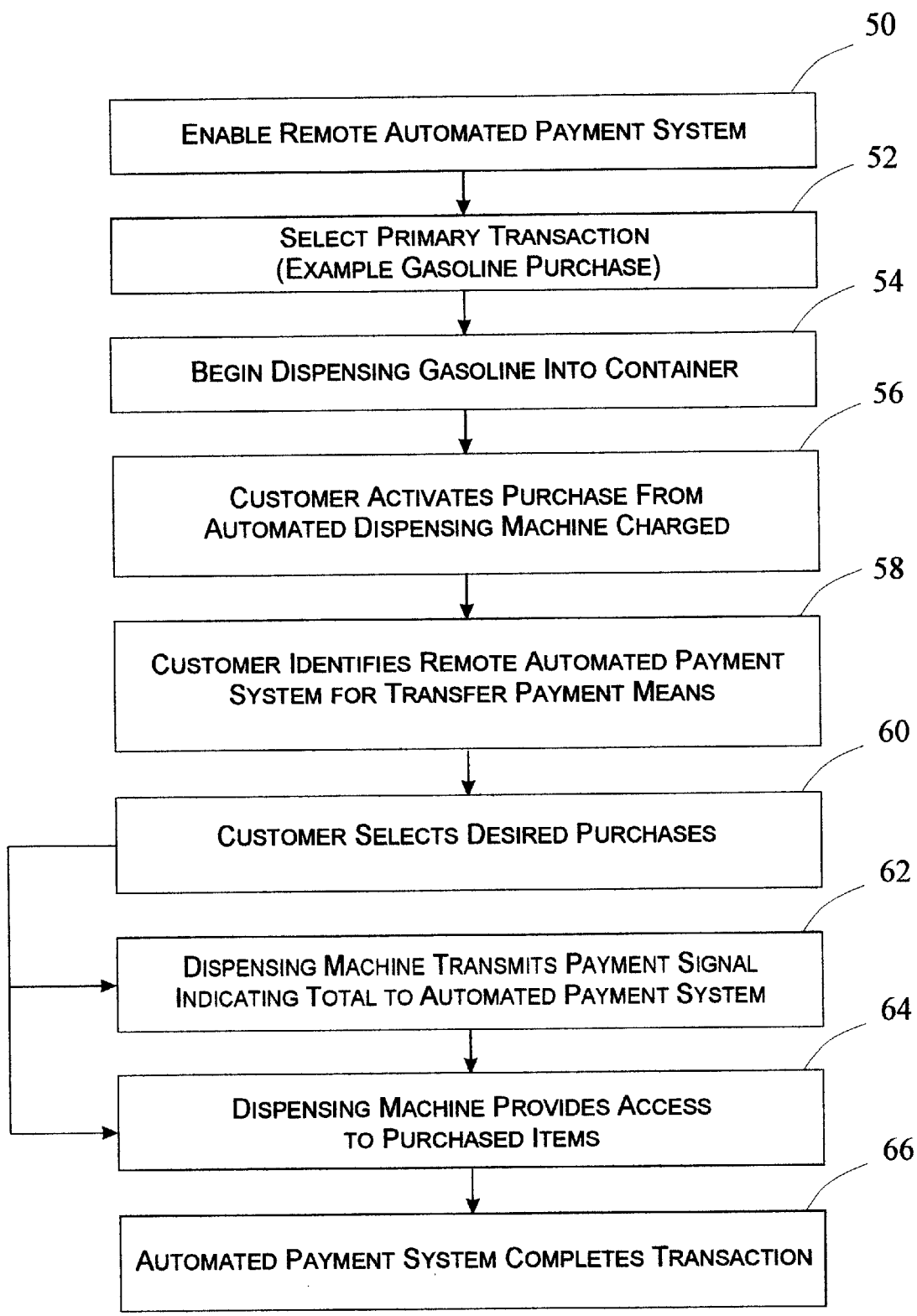
FIG. 2 is a flow diagram illustrating a second potential process for achieving the desired invention.

FIG. 2 illustrates a flow diagram depicting a second embodiment of the present invention. The customer would enable a remote automated payment system 50 by providing a method to identify the user. This may be a credit card with a magnetic strip, a smart card with an Integrated Circuit, an RF interface, an iris reader, a fingerprint reader, or any other known or developed method to determine the user and/or respective financial institution. The customer would follow the respective procedure to enable the remote automated payment system 50. The remote payment system may include a credit card interface or a debit card interface. The customer would select the type of transaction 52 which may be determined by the remote automated payment system. The remote payment system may include a means to dispense cash, fuel, or other devices. The preferred embodiment would be a credit or debit card remote automated payment system placed within a gasoline dispenser. An alternate embodiment would be the use of an Automated Teller Machine (ATM) which dispenses cash. The customer would begin to dispense the desired goods such as gasoline or cash 54. The customer may elect to purchase goods from an automated dispensing machine. The customer would interface with the automated dispensing machine to indicate that the customer desires to make a purchase 56. The automated dispensing machine would include a means whereby the customer can select options for payment 58, including the use of a remote automated payment system. This would further include the ability for the customer to indicate which remote automated payment system is desired should multiple remote automated payment systems be interfaced with one automated dispensing machine. The automated dispensing system would interface with the remote automated payment system to verify the remote automated payment system is activated. The interface may be accomplished using any means such as a voltage transfer or a sophisticated protocol digitally embedded within a signal. Upon verification of the activation of the remote automated payment system, the customer would select the desired purchase(s) 60. The automated dispensing machine would transmit a payment signal to the remote automated payment system to provide the automated payment system with the respective amount for the transaction 62. The automated dispensing machine would provide access to the purchased items 64. The remote automated payment system would tally and complete the transaction 66.

The flow diagram outlined in FIG. 2 ensures the proper customer makes the correct selection and receives the dispensed goods. It further provides a means for multiple purchases at differing prices. This results from the customer making the purchases at the automated dispensing machine as opposed to a remote location.

Figure 3:
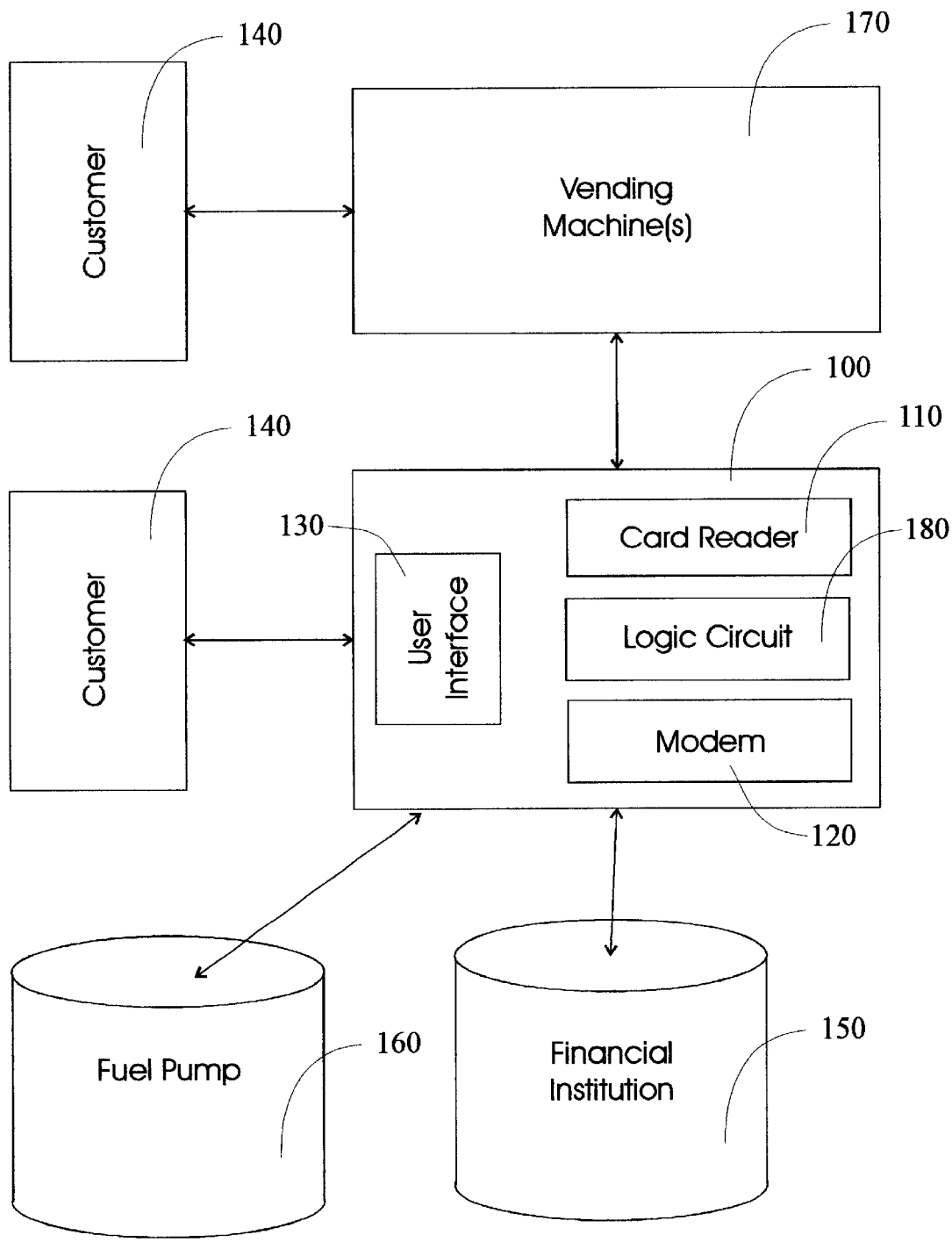
FIG. 3 is a conceptual schematic illustrating the preferred embodiment of the present invention.

FIG. 3 illustrates the a conceptual schematic which includes an automated payment system 100, which includes a customer payment identification device 110, such as a credit card reader, a financial interface device 120, such as a modem, and a user interface device 130 such as an LCD or video monitor and associated user entry features such as push buttons. All of the above specifications are currently known and available in various forms. It should be recognized that as processes for automated payment methods advance, these advanced methods and the associated changes would be included within the spirit and intent of the present invention. One such example would be smart cards which do not require the modem or contacting of a financial institution database 150. Other methods of customer payment identification means may also be developed such as finger print or iris recognition should also be considered and should be included within the spirit and intent of the present invention. The automated payment system may include a keypad and a request for a code from the customer to ensure security. The automated payment system 100 recognizes the associated payment method provided by the customer 140. The automated payment system 100 validates the payment method currently by using a financial interface device 120 such as a modem over communication lines to contact the financial institution's database 150, where the financial institution's database would complete a verification check and provide authorization to the automated payment system 100. Once the payment method is authorized, the automated payment system 100 transmits a signal to the fuel pump 160 allowing the customer 140 to transfer fuel from the fuel station storage tank (not shown) to the desired customer storage tank (not shown). The user interface 130 includes a method for the customer 140 to request additional purchases from proximate electronically controlled vending machines 170, to purchase goods such as drinks, snacks, cigarettes, newspapers, automotive accessories, or even change. The change would be primarily to provide a means for paying automated tolls. Should the customer 140 request an additional transaction besides fuel, the automated payment system 100 would interface with the desired electronically controlled vending machine 170. The present invention may apply many variations of implementation and all should be considered within the spirit and intent of the present invention. The automated payment system 100 may have a user interface 130 such as a flexible, soft menu (see FIG. 4) to provide multiple interface methods with a limited number of entry devices. The customer would select the desired purchase(s) from the user interface 130. The automated payment system would communicate with the respective electronically controlled vending machine 170 and allow the customer 140 to acquire the desired goods (see FIG. 4). The electronic circuitry (not shown) within the fuel dispenser 160 would provide the total purchase (gallons, value, or both) to the automated payment system 100. Upon completion of all purchases, a logic circuit 180 would tally the total sale and complete the automated payment process. In the case which requires interfacing with a financial institution 150, the automated payment system 100 would interface with the financial institution 150 using the financial interface device 120 and transmit the tallied sale. It should be understood that the diagram illustrates one method to achieve the desired results of one automated payment system 100 when interfacing an automated payment system 100 which primary function is to control a fuel dispenser to at least one additional vending machine 170 for one financial transaction. There are many other methods achieve the same results within the spirit and intent of the present invention.

Figure 4:
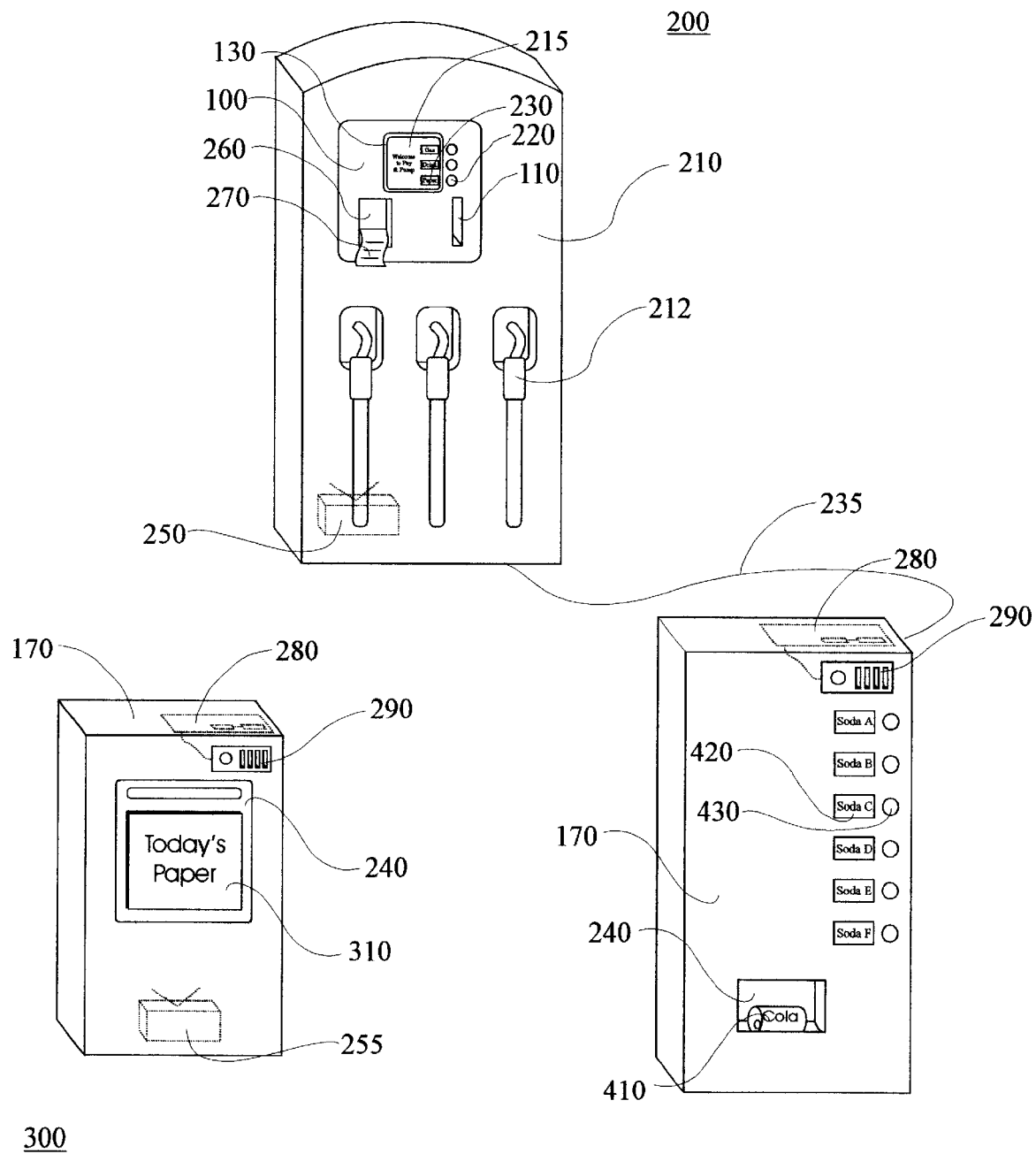
FIG. 4 is an isometric view of a fuel dispenser including the present invention and two examples of associated electronically controlled vending machines.

FIG. 4 illustrates an isometric view of one proposed implementation of the present invention, including a completely automated multiple purchase fuel station 200. The automated multiple purchase fuel station 200 includes an automated payment and fuel dispenser system 210. At least one of the multiple fuel dispensers 212 would be allowed to operate upon authorization of the payment method from the automated payment system 100. It can be recognized that the automated payment system 100 may be mounted in conjunction with or external to the automated fuel dispenser 210 and control one or multiple fuel dispensers 212. The automated payment system 100 may be of various forms and functions without deviated from the spirit or intent of the present invention. The illustrated automated payment system 100 includes a customer payment identification device 110, illustrated as a card reader, a financial interface device 120 (not shown in FIG. 4) and a user interface device 130 illustrated as a flexible, soft menu LCD 215 and respective entry points 220, such as push buttons or touch pads. The flexible, soft menu LCD 215 includes 15 software provided through a logic circuit 180 (not shown in FIG. 4) to change the functions of each entry point 220 and identifying the function of each entry point 220 by changing the user interface icons 230 displayed on the flexible, soft menu LCD 215. The customer (140 of FIG. 3) would enter a request for additional purchases by selecting the respective entry point 220. The automated payment system 100 would display additional information to walk the customer (140 of FIG. 3) through the desired purchase(s). The automated payment system 100 would transmit a signal via wires 235 or via transmitter 250 and receiver 255 to the respective vending machine 140 illustrated as a newspaper vending machine 300 and a drink vending machine 400. The vending machine (s) (170 of FIG. 3) would include electronic circuitry 280 which controls an automated release system 240 which would allow the customer 140 to acquire the desired goods such as a newspaper 310 or a drink 410 upon receipt of a transmitted signal from the automated payment system 100. The automated release system 240 may utilize the circuitry 280 to communicate with the automated payment system 100 to provide a method for confirmation of receipt of goods, commonly referred to as a closed loop system. It can be recognized that the transmitter 250 and the receiver 255 may be designed to function as both receiver and transmitter, providing two way communications, or the devices may include two such apparatus to provide the same results within the scope of the present invention. The circuitry may also include the ability to decipher the transmitted signal to determine selections made by the customer 140 at the automated payment system 100. Some vending machines 170, such as a drink dispenser 400, may require additional selections to determine the particular selection from the variety of goods offered. The selections may be made through selecting the desired entry point 430 as identified by the respective selection labels 420. The vending machine 170 may communicate with the automated payment system 100 to provide details of the final transaction. The automated payment system closes the transaction by tallying the purchases (fuel and goods), communicates with the financial institution data base (150 of FIG. 3) with the tally, then prints and dispenses a receipt 270 using a receipt printer 260 for the customer (140 of FIG. 3).

Figure 5:
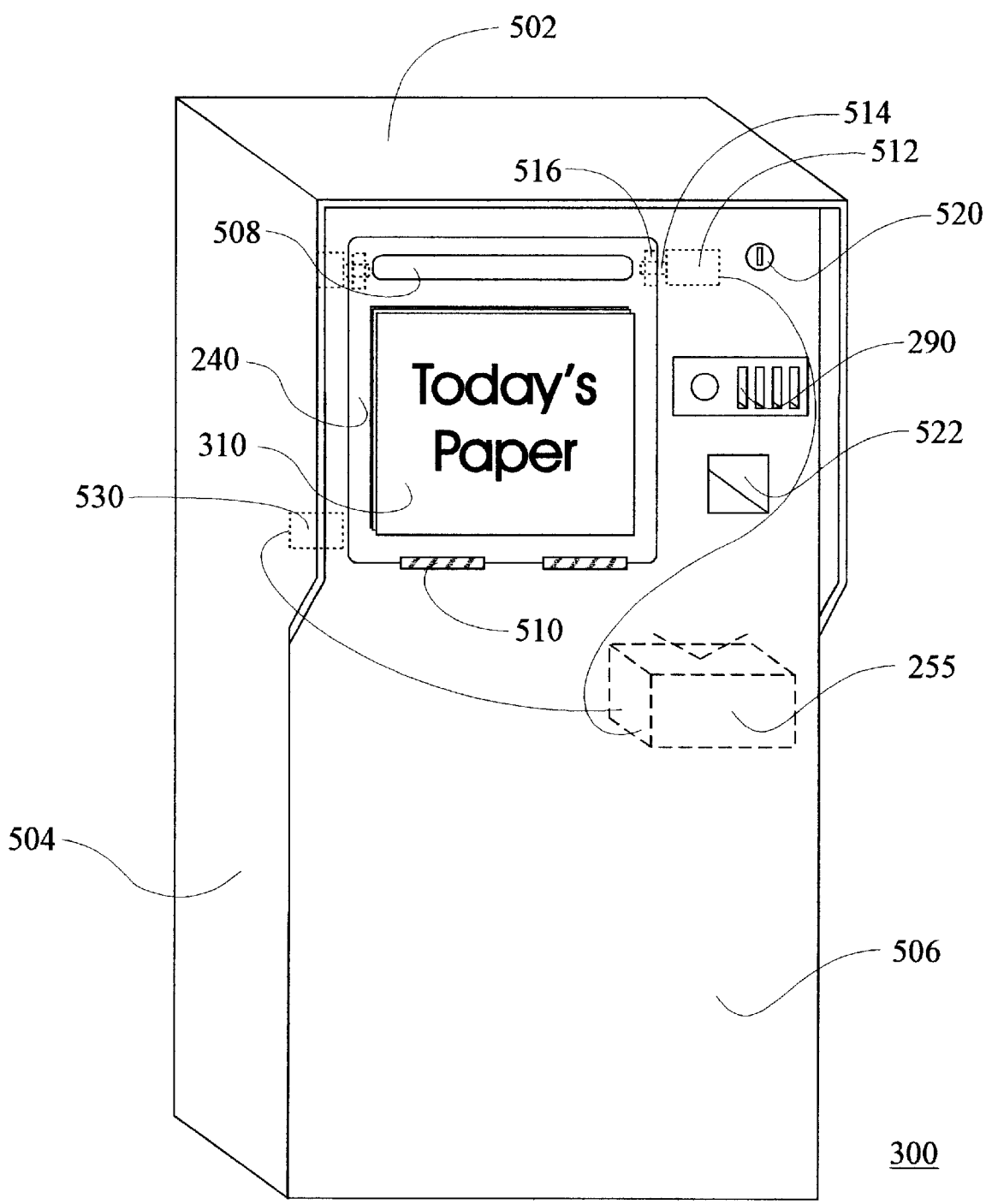
FIG. 5 is an isometric view of a newspaper vending machine further detailing the operation of the invention in the preferred embodiment.

FIG. 5 illustrates a more detailed isometric view of a newspaper vending machine 300 to more clearly define the preferred embodiment of the present invention. The newspaper vending machine 300 includes a housing comprising a top surface 502, side surface(s) 504, and front and rear surfaces 506. The housing contains mechanisms required to dispense newspapers, including a door 508 mounted which can be mounted to the housing via hinges 510. The automated release system 240 can include a clear component to display the current newspaper 310. The automated release system can include a release mechanism, comprising a release solenoid 512 which activates a shaft 514, whereby the shaft 514 is placed into and removed from a locking mechanism 516. The locking mechanism 516 may be a loop coupled to the door of the automated release mechanism 240. The solenoid 512 can be activated by circuitry (280 of FIG. 4), whereby the circuitry (280 of FIG. 4) may be controlled by a mechanical or electromechanical coin receiving mechanism 290, a remote automated payment system 100, a transmitter receiver 255, and the like. The present invention introduces the novel apparatus of using a remote circuit such as placing the circuitry 280 in a remote automated payment system 100, transmitting a signal via wire or wireless technology to circuitry within the automated dispensing apparatus (170 of FIG. 3), and the like. Newspaper vending machines 300, in particular, further the need for low power consumption. By using a remote automated payment system 100, the newspaper vending machine 300 reduces the power requirements, making the use of batteries feasible. The use further provides a means to include payments other than coins, such as credit cards, debit cards, cash tendered to drive through tellers, other vending machines and the like. Credit and debit cards require communication facilities which are costly for newspaper vending machines 300 to install and maintain. Drive through sales are can be impulse sales if the consumer is exposed to the option, such as by placing a vending machine in the drive through lane and including capabilities to purchase the item by including the sale with the remaining items purchased at the drive through in the transaction.

Further, an inventory sensor 530 may be included in the newspaper vending machine to sense either a low inventory or depleted inventory of newspapers 310. The inventory sensor can interface with a transmitting device 255 which can transmit a signal to a receiver when the inventory reaches a predetermined count. The process will be described in detail within the specification.

Figure 6:
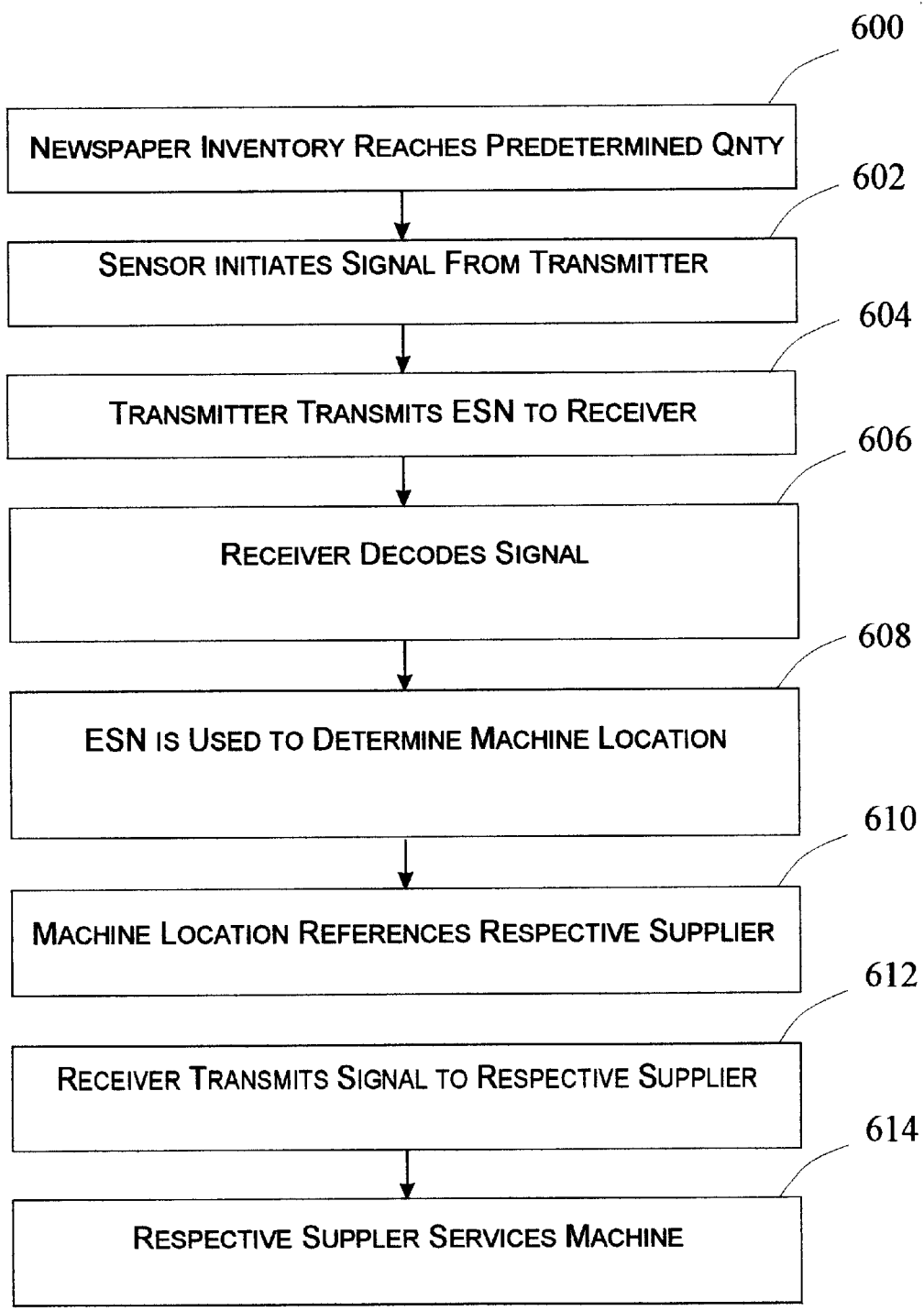
FIG. 6 is a flow chart diagram of a means to communicate to a remote service request from a newspaper vending machine to a supplier such as when inventory is depleted.

FIG. 6 is a flow chart diagram which illustrates one method in which a transmitter can notify a party that a particular newspaper vending machine 300 requires servicing. As the newspapers are sold, the inventory is reduced, as in first step 600. The reduction of inventory would meet or surpass a predetermined number whereby once the inventory surpasses the predetermined number, a sensor 530 would communicate with a transmitter 255 to initiate a signal as a second step 602. The transmitter 255 would then transmit a signal to a receiver as a third step 604. The signal can include an electronic serial number or the like to provide a means for the receiver to identify the transmitting device 255. The receiver would receive the signal with the encoded information and decode it as a fourth step 606. The receiving and decoding device would use the decoded information to determine the location of the newspaper vending machine 300 which requires servicing. The receiving and decoding device may further include a means to determine the time and a means to record any desired information such as specific vending machine 300 and time in which the signal is received. The recorded information may be provided to the respective party such that the respective party may utilize the information to optimize the inventory management for each individual vending machine 300. The specific vending machine and location can be determined by comparing the electronic serial number (ESN) or other encoded information to a known database which cross-references a code with a known location as a fifth step 608. The receiver would in turn use the location information to determine which respective supplier should be notified to service the newspaper vending machine 300 and how to contact the respective supplier as a sixth step 610. The receiver can then transmit a signal the respective supplier using a selective call receiver, or communicate with the respective supplier in some other manner, to notify the respective supplier that the specific machine requires servicing as a seventh step 612. The respective supplier would then service the newspaper vending machine 614 as an eighth step 614. The information may further be recorded at the receiver, forwarded to the respective manager, or the like, to provide a means to track the activities of each particular newspaper vending machine 300.

Figure 7:
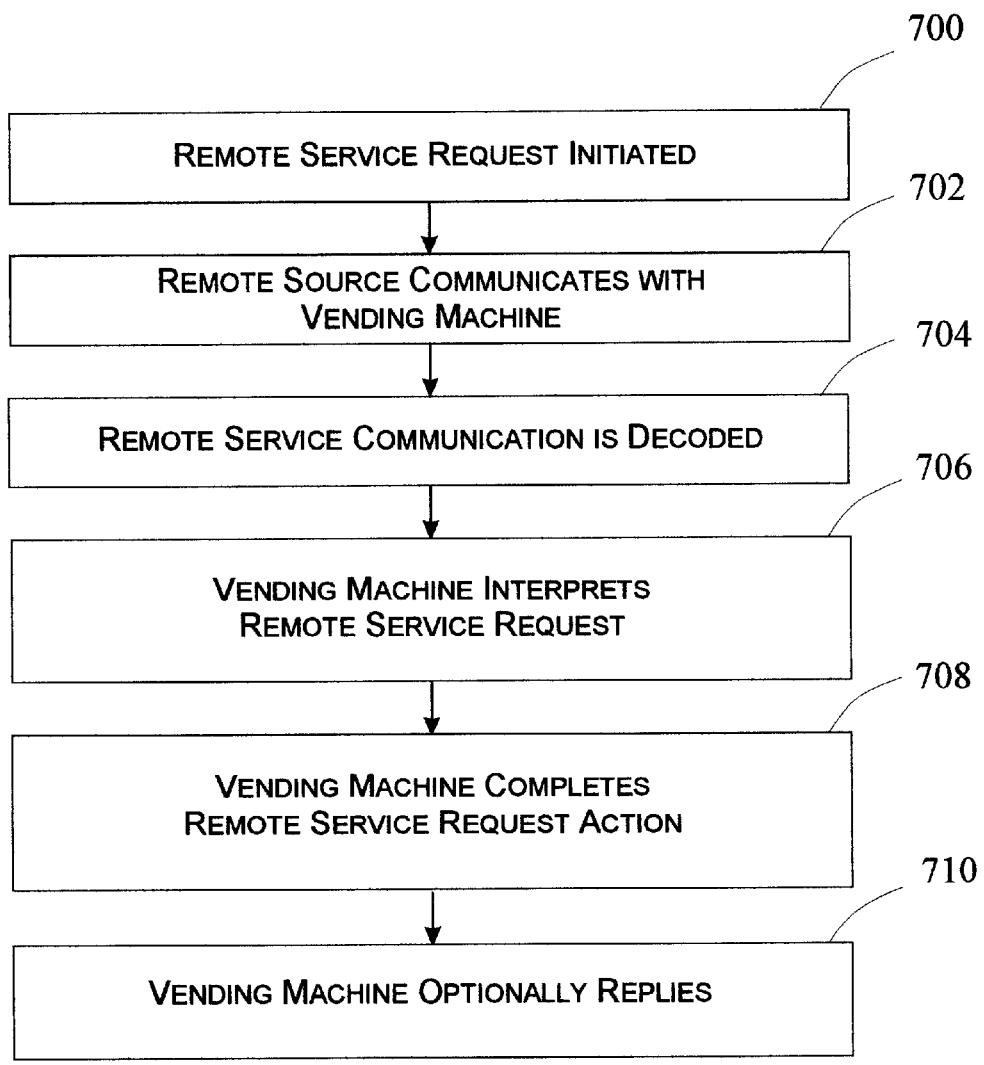
FIG. 7 is a flow chart diagram of a means to communicate a remote service request to a vending machine from a supplier such as when to change the price of goods.

FIG. 7 is a flow chart diagram illustrating the use of a means for the supplier to service the vending machine from a remote site. The flowchart may be used to determine whether the inventory of the vending machine has been removed or depleted, change the price of the goods, and the like. These are particularly useful features of vending machines for items requiring timely servicing, such as perishable foods (dairy products), periodicals (newspapers), and the like. The supplier would initiate a remote service request as in the first step 700. The supplier would remotely contact the vending machine using wired or wireless technology as in the second step 702. The preferred embodiment would utilize low power, wireless technology'such as that of a two-way paging device. The supplier would utilize a device which would encode the desired service request in a manner in which the vending machine can decode the same signal. One such device would use two-way paging technology to encode, transmit, receive and decode a signal between the supplier and the remote vending machine. An alternative, less desirable technology, would be to use encoded signals transmitted across wires. The signal from the remote site is then decoded by a device included within the automated vending machine as in the third step 704. One such device can be a paging receiver and decoder. Another can be an electronic circuit capable of decoding a signal transmitted through wires, fiber-optics, and the like such as a circuit of a modem. The decoded signal would initiate the desired process within the vending machine as in the fourth step 706. The signal may be decoded to transmit an analog or digital signal to a price controller such as the electronically controlled price controllers currently used. The current electronic price controller utilizes settings of a series of dip switches, key location and the like. The output of the decoded signal can provide a voltage, circuit, or other means to simulate the same action of the dip switches, key location and the like. Alternatively, the signal may cause a circuit to verify the inventory of goods by completing at least one iteration of an inventory inspection procedure. One such procedure can be an electronic circuit to verify if a switch is in a state related to a depleted inventory. A mechanical switch may be used which changes from an open circuit when sensing or subjected to a force from at least one unit, and closed when not sensing or there are no units applying any forces to the switch. A sensing circuit can be used to determine the inventory. A variety of such circuits are available from any of the companies providing sensors. The vending machine would complete the desired process as requested by the remote service request provided by the supplier such as setting the price or determining inventory as in a fifth step 708. Upon completion of the process requested by the remote service request, the vending machine may optionally transmit a results signal to the supplier as in a sixth step 710. One such desirable step would be a response to an inquiry about inventory levels made by the supplier.

The invention further introduces the novelty of combining the two interfaces into one service feature within a vending machine. The receiver-transmitter 255 may be used to interface with a remote automated payment system 100, a drive through service, and the like, and a receiver which communicates with a respective supplier to inform the respective supplier that the vending machine requires servicing.

It should be recognized that there are many options regarding how and where to place the various interfaces and the variations should not limit the spirit or intent of the present invention.

What is claimed:

1. A method for purchasing items from a vending machine, the method comprising the steps:

a consumer registers a means of payment at a remote payment location by inserting at least one of a credit card, a debit card, and cash into a remote payment location, whereby the remote payment location is located other than within the vending machine, the consumer communicates with the vending machine that the method of payment is to be from the remote payment location, the vending machine verifies the registration of payment at the remote payment location;

the consumer selects an item to purchase from a vending machine, the vending machine communicates the purchase with a remote payment system, the remote payment system verifies an acceptable transaction and communicates with the vending machine, the vending machine distributes the goods, and using a remote interface system located within the remote payment system to modify the prices of goods.

2. A method for purchasing a newspaper from a newspaper vending machine the steps comprising:

providing payment via a remote payment means at a location other than within the newspaper vending machine; and providing a signal from the remote payment means to the newspaper vending machine, whereby the signal triggers a means that allows the consumer to remove a newspaper from the newspaper vending machine; and using a remote interface system located within the remote location and using the remote interface to modify the selling price of the newspapers.

* * * * *